April 2, 1935.  F. H. MUELLER  1,996,345
METHOD OF AND APPARATUS FOR DRILLING AND PLUGGING MAINS
AND PIPES AND INSERTING AND REMOVING SUCH PLUGS
Filed Jan. 12, 1933  2 Sheets-Sheet 1
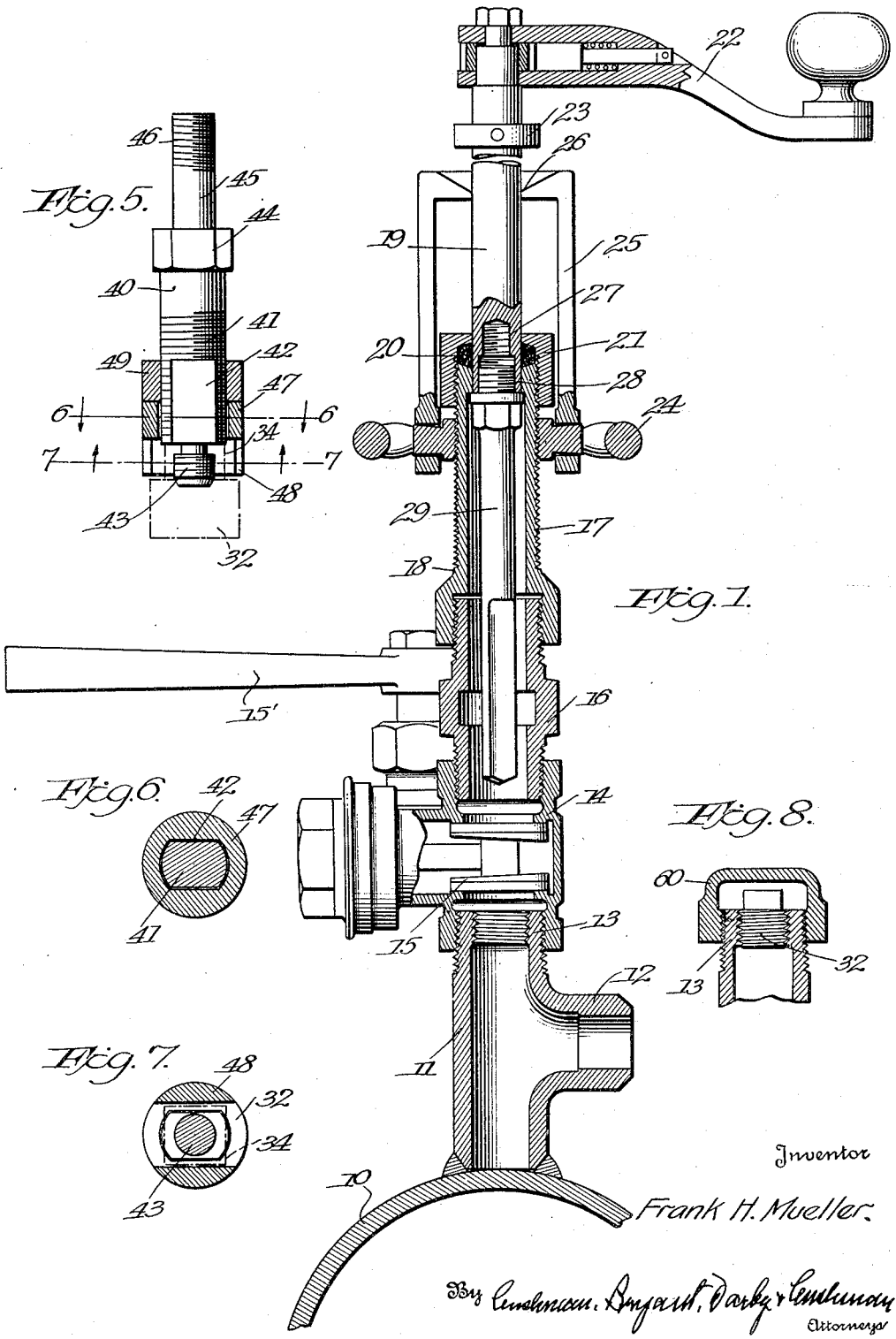
Inventor
Frank H. Mueller
By Cushman, Byrant, Darby & Cushman
Attorneys

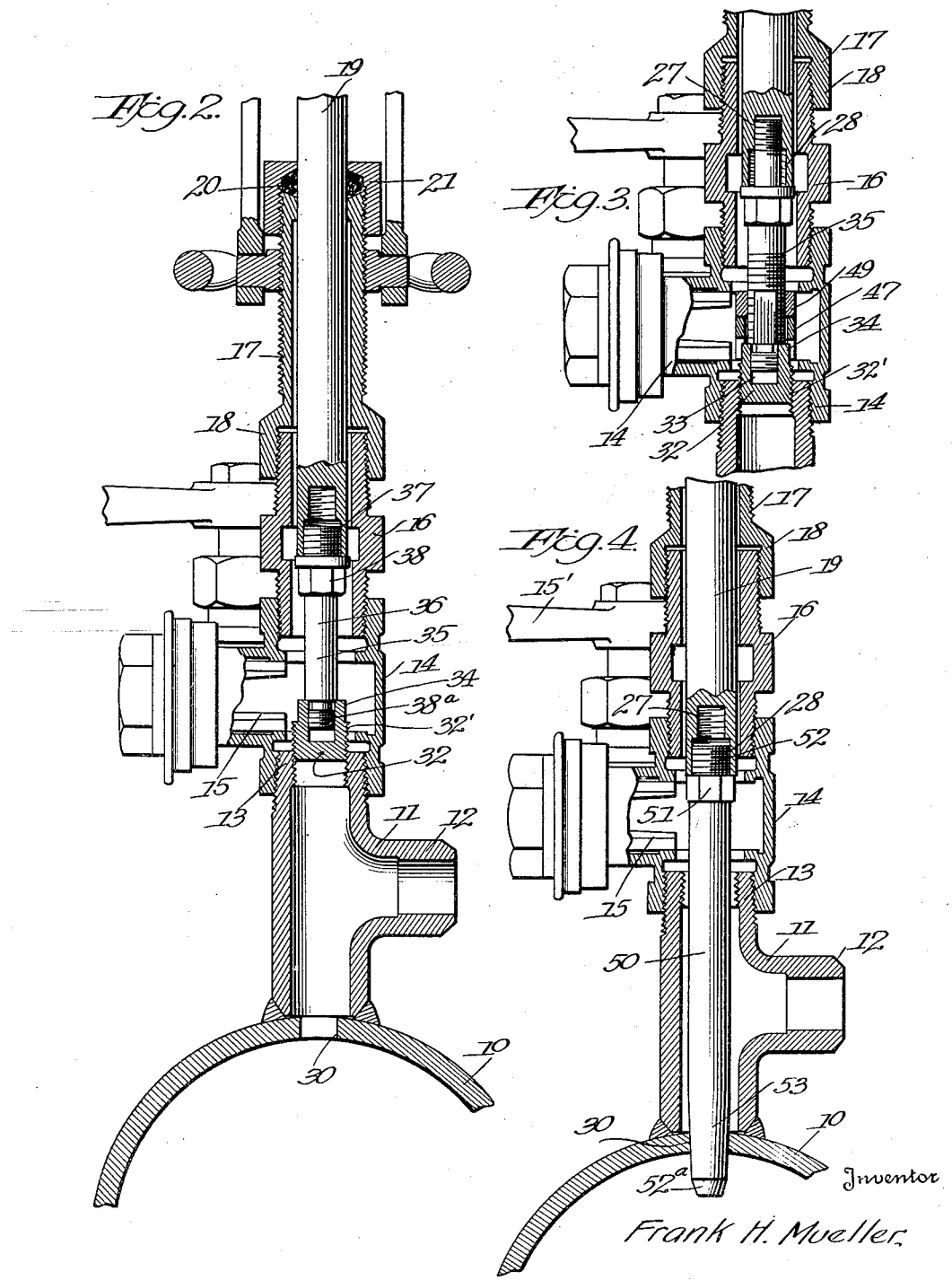

Patented Apr. 2, 1935

1,996,345

UNITED STATES PATENT OFFICE 1,996,345

METHOD OF AND APPARATUS FOR DRILLING AND PLUGGING MAINS AND PIPES AND INSERTING AND REMOVING SUCH PLUGS

Frank H. Mueller, Decatur, Ill., assignor to Mueller Co., Decatur, Ill., a corporation of Illinois Application January 12, 1933, Serial No. 651,438

12 Claims. (Cl. 137—73)

The present invention relates to a method of and apparatus for drilling and plugging mains and pipes and inserting and removing such plugs, and is more particularly adapted for use in connection with gas or water mains.

In making service connections to gas and water mains, it is customary to include a stop valve in the connection closely adjacent the main in order that the flow through the connection may be cut off at the main when repairs are made between the main and the service pipe meter. In actual practice, repairs to the connecting pipes are seldom necessary and in by far the great majority of instances, the gate valve is never used to cut off the flow from the main. The types of gate valves ordinarily used for the purpose described above are comparatively expensive fittings, considering the slight necessity for their use.

The principal object of the present invention is to provide plugs for mains or pipes and a method of and apparatus for inserting and removing such plugs, whereby the use of the usual stop valve in the connecting pipe at the main is eliminated; certain features of the invention being adapted for use with structures other than piping and plugs therefor.

Another important object of the invention is to provide a plug for insertion in the main at the connection to the connecting pipe and a means for inserting a plug of this type in such a manner that the plug will completely close off the flow from the main regardless of slight differences in the size of the aperture through which the main communicates with the connecting pipe. Gas and water mains are usually formed of either cast or wrought iron and the plug provided by my invention is of such design and material that it may be forced tightly into the aperture in the main and will, in extreme cases, even shape or force the aperture in the main to proper outline to permit the entrance of a plug so that a close seat will be provided for the plug.

A still further object of the invention is to provide an apparatus for drilling a main or pipe and for inserting and removing the plugs disclosed herein, which apparatus is readily adaptable either for drilling the main or pipe or for inserting or removing a plug therein and regardless of whether the plug is threaded or adapted to have a sliding fit in the aperture for which it is provided.

In the drawings, wherein like numerals refer to similar parts throughout the several views:

Figure 1 is a vertical sectional view through the apparatus of my invention, showing the apparatus attached to the main and fitting for drilling a hole in the main.

Figure 2 is a vertical sectional view similar to Figure 1 with portions of the apparatus omitted and showing the use of the apparatus to insert in a plug in the fitting connecting the main with the service pipe.

Figure 3 is a view of the apparatus, in vertical section and with portions broken away, showing the apparatus fitted for removing a plug from the fitting.

Figure 4 is a view similar to Figure 3 but showing the apparatus connected for inserting a plug in the hole in the main with which the pipe connections communicate.

Figure 5 is an enlarged detail view showing the plug extracting device illustrated in Figure 3.

Figure 6 is a horizontal sectional view taken on the line 6—6 of Figure 5.

Figure 7 is a horizontal sectional view taken on the line 7—7 of Figure 5, and

Figure 8 is a detail sectional view showing a cap which may be placed over the plug.

The numeral 10 indicates a gas or water main having a T 11 welded thereto. The lateral portion 12 of the T may be formed for welding to a steel or wrought iron pipe or may be threaded for coupling to a threaded pipe by means of a screw threaded coupling. The upper end of the T 11 is threaded, as shown at 13, and in carrying out my method, a fitting 14 provided with a valve, preferably a gate valve 15 operable by a handle 15', is threaded to the upper end of the T as shown in Figure 1. An adapter sleeve 16 is threaded into the upper end of the valve fitting 14. A device or machine 17 generally similar to pipe drilling machines of well known construction and including a feed sleeve 18 is positioned upon the adapter sleeve 16 by means of screw threaded engagement between the feed sleeve 18 and the upper end of the adapter sleeve 16. A bar 19 is slidably and rotatably mounted within the feed sleeve 18, a tight joint being maintained between the two by means of a packing 20 secured upon the upper end of the feed sleeve 18 by an internally flanged collar 21. The bar 19 is provided with an operating handle 22 at its upper end which includes a double ratchet device permitting the bar 19 to be rotated in either direction with a ratchet effect. A collar 23 is fixed upon the upper portion of the bar 19 beneath the handle 22 and in order to permit the bar 19 to be fed downwardly in the usual manner, a feed screw 24 is threaded upon the feed sleeve 18 and engages the bar 19 by means of a yoke 25 pivoted upon the feed screw and having its head portion slotted as at 26 so that it may be swung into engagement with the upper surface of the collar 23 from the position shown in Figure 1.

The lower end of the bar 19 is provided with a left-hand threaded socket 27 and a lower counter-bored socket 28 threaded with right-handed threads.

In order to drill a hole in the main 10 within the T 11, a drill 29 is fitted in the counter-bored socket 28 of the bar 19 as shown in Figure 1 and, with the gate valve 15 open, the bar 19 is moved downwardly so that the drill 29 will engage the main 10. The yoke 25 is then positioned to bear upon the collar 23 of the bar and the apparatus 17 is operated in the usual manner to drill a hole in the main, i. e., by rotation of the bar 19 by means of the handle 22 and through a downward feeding pressure resulting from rotation of the feed screw 24 upon the feed sleeve 18. A hole or aperture 30 is drilled in the main 10 as shown in Figures 2 and 4. When the drilling of the hole is completed, the bar 19 and drill 29 may be moved upwardly and the gate valve 15 operated to closed position. No gas or water will escape from the device while the valve is open and after the hole 30 is drilled because of the threaded and packed connections provided throughout.

With the gate valve 15 closed, the feed sleeve 18 may be removed from the adapter sleeve 16 and the drill 29 disconnected from the bar 19. A plug 32 (see Figure 2) having threads 32' on its lower outer portion and a socket 33 in its upper portion provided with right-handed threads is provided for fitting into the upper end of the T 11 which is internally threaded. The plug 32 is squared on its outer upper surface as shown at 34 in Figures 2, 3, and 7 for a purpose hereinafter described. In order to position the plug 32 in the upper end of the T 11, an inserting adapted 35 is included in my apparatus. The inserting adapter 35 is illustrated in Figure 2 and includes a shank portion 36 having its upper end threaded with right-handed threads as shown at 37. A hexagonal portion 38 is provided upon the upper portion of the shank 36 so that the adapter may be engaged by a wrench for insertion and removal in the bar 19. The lower end of the shank 36 is provided with a small head 38a which is screw threaded to engage the threads of the socket 33 in the upper portion of the plug 32.

When the plug 32 is connected to the bar 19 by means of the inserting adapter 35, the bar 19 and feed sleeve 18 may be again positioned upon the adapter sleeve 16, the gate valve 15 opened and the threaded plug 32 positioned in the upper end of the T 11 by rotation of the handle 22, closing the upper end of the T. The feeding sleeve 18, adapter sleeve 16 and valve fitting 14 are then disconnected from the T 11 and slid upwardly upon the bar 19. The hexagonal portion 38 of the inserting adapter 36 may now be engaged by a wrench and held against rotation while the bar 19 is turned to disconnect it from the inserting adapter. The squared upper end of the plug 32 can then be engaged by a wrench and held against rotation while the inserting adapter 35 is removed therefrom.

The plug 32 replaces the usual stop valve ordinarily provided at each service connection. It is obvious that the plug 32 is considerably lower in cost than a stop valve and the saving thus effected in numerous connections involves a very considerable amount.

For the purpose of removing the plug 32 by means of the apparatus 17, an extracting adapter 40 illustrated in detail in Figures 5, 6 and 7 is provided. The adapter 40 includes a shank portion 41 externally threaded with right-handed threads and having diametrically opposite flattened surfaces 42 at its lower end as shown in Figures 5 and 6. A relatively small screw threaded head 43 is integral with the lower end of the shank 41 and is threaded for connection to the threaded socket 33 of the plug 32. A hexagonally surfaced portion 44 is provided at the upper end of the shank 40 to permit the adapter to be engaged by a wrench and a stem 45 extends from the upper end of the shank, as shown in Figure 5, and is threaded with left-handed threads at its upper end 46. A yoke 47 having a bore therethrough with flattened walls to correspond to the lower flattened end of the shank 41 is adapted to engage the lower end of the shank, the yoke including downwardly extending tongues 48 spaced to permit them to contact with opposite sides of the upper squared end 34 of the plug 32.

The operation of removing the plug 32 from the T 11 is as follows: With the yoke 47 raised out of engagement with the squared upper end 34 of the plug, the extracting adapter 40 is connected to the plug by engagement of the lower threaded head 43 of the adapter in the socket 33 of the plug. The yoke 47 is then dropped to permit the tongues 48 to engage the squared end 34 of plug 32. A nut 49 may be threaded upon the shank 41 of the adapter and may be rotated downwardly to lock the yoke 47 upon the plug 32. The gate valve fitting 14 is then threaded upon the upper end of the T 11 and the bar 19 of the apparatus 17, with the adapter sleeve 16 and sleeve 18 loose thereon, may be threaded upon the adapter 40, the left-handed threads 46 on the stem 45 of the adapter engaging the left-hand threaded upper socket 27 at the lower end of the bar 19 as shown in Figure 3. The adapter sleeve 16 may then be threaded into the upper end of the gate valve fitting 14 and the feed sleeve 18 threaded upon the adapter sleeve 16, all as shown in Figure 3. Rotation of the operating handle 22 of the bar 19 in a counter-clockwise direction will remove the plug 32 from the T 11, all possibility of the extracting adapter 40 being disconected from the plug 32 by disconnection of the right-hand threaded head 43 from the socket 33 of the plug 32 being prevented by reason of the fact that the adapter 40 and plug 32 are locked together by the yoke 47. When the plug 32 has been completely disengaged from the T 11 and raised above the gate valve 15, the latter may be closed, and the adapter sleeve 16 and the entire apparatus 17 can then be removed from the gate valve fitting to permit any work to be carried out with which the presence of the plug 32 would interfere.

If any work is to be performed upon the pipes connected at 12 to the T 11, my invention contemplates a means of closing off the T 11 from the main 10 without the provision of any valve structure such as is ordinarily used. For this purpose, a shut-off plug 50 of hardened steel is provided, best shown in Figure 4. The upper end of the shut-off plug 50 is hexagonally surfaced as shown at 51 in order that it may be engaged by a wrench and a right-handed threaded stem 52 extends upwardly from the latter portion for engagement with the threaded counter-bore 28 of the bar 19. The extreme lower end of the shut-off plug is sharply tapered, as indicated in Figure 4, to serve as a pilot, and the portion of the plug immediately above the pilot portion 52a is more gradually tapered as shown at 53.

To insert the shut-off plug 50 in the aperture 30 in the main and within the T 11, after the plug 32 has been removed, the plug is threaded into the lower end of the bar 19 at the counterbored socket 28. The adapter sleeve and feed sleeve 18 are connected to each other and the former is connected to the gate valve fitting 14. The lower end of the bar 19 will, of course, be raised relatively to the feed sleeve 18 so that the lower end of the shut-off plug 50 will be above the gate valve 15. With the elements connected as described, the gate valve 15 may be opened and the bar 19 carrying the shut-off plug 50 may be moved downwardly into the T 11 as indicated in Figure 4. The yoke 25 is then engaged over the collar 23 upon the bar 19, and the latter may then be forced downwardly by rotation of the feed screw 24 upon the feed sleeve 18 to force the shut-off plug 50 tightly into the aperture 30 of the main as shown in Figure 4. Since the shut-off plug 50 is of harder material than the usual main 10, the tapered portion 53, moving downwardly in the aperture 30, will force the aperture into shape to provide a tight fit between the tapered portion 53 of the plug and the walls of the aperture. All possibility of leakage from the main during work upon the pipes connected to the T 11 at the lateral extension 12 will thereby be obviated.

In order to remove the shut-off plug 50 from the aperture 30 in the main 10, the yoke 25 is positioned to bear against the lower surface of the collar 23 on the bar 19 and upward rotation of the feed screw 24 will thereby result in upward movement of the plug 50. The subsequent steps in the removal of the plug 50 from the bar 19 and the method of replacing the plug 32 in the upper end of the T 11 will be apparent from the description in the proceeding portion of the specification.

If desired, and as shown in Figure 8, a cap 60 may be placed upon the upper end of the T 11 after the plug 32 has been inserted therein, as previously described. The cap 60 encloses the plug 32 and thereby prevents all possibility of leakage. Cap 60 is threaded upon the threads about the exterior of the upper end 13 of the T 11.

It will be understood that the invention is not limited to the details of construction shown in the drawings and that the examples of the use of the plugs, apparatus and method which have been given, do not include all of the uses of which the plugs and apparatus are capable or by which the method may be followed; also, that the phraseology employed in the specification is for the purpose of description and not of limitation.

I claim:—

1. The method of shutting off a main from a pipe connected thereto wherein the main is connected to the pipe through an aperture and the pipe includes a removable closure adjacent the main, comprising closing the exterior of the closure to the atmosphere, removing the closure and driving a tapered plug of harder material than the main into the aperture in the main to close the aperture.

2. The method of inserting and removing a plug with respect to a main and a pipe connection thereto provided with a plugged outlet, comprising connecting an extracting tool to the pipe to close the plugged outlet to atmosphere, removing the plug from the outlet and inserting a second plug to close the flow from the main to the pipe connection.

3. The method of closing a main from a pipe connected thereto wherein the pipe includes an outlet provided with a plug removable by a rotary movement, comprising connecting an extracting tool to the pipe to close the plugged outlet to the atmosphere, extracting the rotary plug and inserting a driven plug within the pipe at its point of communication with the main.

4. The combination with a drilling machine including means to secure the machine to a pipe by a fluid tight connection, means to support a plug on the machine for insertion in the pipe either by threading movement or rectilinear movement and means to support a plug on the machine for removal either by unthreading movement or rectilinear movement, each of said means being concentrically arranged on said machine.

5. In combination, a device for inserting and removing with respect to a pipe a threaded plug having a threaded tool engaging portion, comprising a tool provided with two concentric sockets respectively threaded in opposite directions, a connection for threading the plug into the pipe having threaded ends, one of said ends being adapted to be threaded into the socket of the plug and the other end threaded into one of the sockets in the tool, and means for removing the plug from the pipe comprising a connection having threaded ends, one of the ends being adapted to be threaded into the socket of the plug and the other end threaded into the other socket of the tool, and means to hold the plug against turning movement with respect to said last-named connection.

6. The combination with a device operable for inserting and removing plugs in a pipe and including an operating bar movable for either threading or rectilinear movement, of means to secure a plug to the bar for insertion in the pipe either by threading or driving movement, and means to secure a plug to the bar for removal from the pipe either by unthreading or pulling movement.

7. The combination with a tool for inserting a threaded element in a body by threading movement, of means for connecting the tool to the threaded element for unthreading and lifting movement of the latter, and means to lock the element to the tool to prevent rotary movement of the element with respect to the tool.

8. In combination, a device for inserting in and removing from a body an element having a threaded connection with the body, comprising a tool provided with two concentric sockets respectively oppositely threaded, means to connect the tool to the element for movement in one direction comprising a member threadedly engaging the element and one of the sockets of the tool, and means for removing the element from the body comprising a member adapted to threadedly engage the element and the other socket of the tool, and a collar keyed to and slidable on said member and adapted to make keyed engagement with the plug to prevent relative rotation between the plug and said member.

9. An apparatus for removing from a body a plug having threaded connection with the body by threads running in a given direction, said apparatus including operating means, a member connected to said operating means by threads running in the opposite direction and connected to said plug by threads running in the same direction as those of the threaded connection, and means to prevent relative rotation between the plug and said member.

10. An apparatus for removing from a body a plug having threaded connection with the body by threads running in a given direction, said apparatus including operating means, a member connected to said operating means by threads running in the opposite direction and connected to said plug by threads running in the same direction as those of the threaded connection, and a collar keyed to and slidable on said member and adapted to make keyed engagement with the plug to prevent relative rotation between the plug and said member.

11. A plug for closing an aperture in relatively soft metal, said plug being solid and formed of relatively hard metal and provided with a smooth tapered portion adapted to closely engage and mold the walls of the aperture to form a fluid-tight seal.

12. In combination, a device for inserting and removing with respect to a pipe a threaded plug having a threaded tool engaging portion, comprising a tool provided with two concentric sockets respectively threaded in opposite directions, a connection for threading the plug into the pipe having threaded ends, one of said ends being adapted to be threaded into the socket of the plug and the other end threaded into one of the sockets in the tool, and means for removing the plug from the pipe comprising a connection having threaded ends, one of the ends being adapted to be threaded into the socket of the plug and the other end threaded into the other socket of the tool, and means on one of said connections to hold the plug against turning movement with respect thereto.

FRANK H. MUELLER.